United States Patent [19]
Muller

[11] Patent Number: 6,044,418
[45] Date of Patent: Mar. 28, 2000

[54] METHOD AND APPARATUS FOR DYNAMICALLY RESIZING QUEUES UTILIZING PROGRAMMABLE PARTITION POINTERS

[75] Inventor: Shimon Muller, Sunnyvale, Calif.

[73] Assignee: Sun Microsystems, Inc., Mountain View, Calif.

[21] Appl. No.: 08/885,232

[22] Filed: Jun. 30, 1997

[51] Int. Cl.[7] ................................................ G06F 13/00
[52] U.S. Cl. ........................ 710/56; 710/39; 710/41; 711/173
[58] Field of Search .................. 395/650, 311, 395/800, 843, 600, 846, 876, 874.5, 564, 497.04, 250, 235, 200.17, 859, 860, 861; 364/900; 370/392; 710/56, 39.41; 711/173

[56] References Cited

U.S. PATENT DOCUMENTS

| | | | |
|---|---|---|---|
| 4,539,637 | 9/1985 | DeBruler | 364/200 |
| 4,627,052 | 12/1986 | Hoare et al. | 370/88 |
| 4,641,302 | 2/1987 | Miller | 370/60 |
| 4,652,874 | 3/1987 | Loyer | 340/825.05 |
| 4,737,953 | 4/1988 | Koch et al. | 370/94 |
| 4,807,111 | 2/1989 | Cohen et al. | 364/200 |
| 4,811,337 | 3/1989 | Hart | 370/85 |
| 4,850,042 | 7/1989 | Petronio et al. | 455/606 |
| 4,899,333 | 2/1990 | Roediger | 370/427 |
| 4,922,503 | 5/1990 | Leone | 370/85.13 |
| 4,933,938 | 6/1990 | Sheehy | 370/85.13 |
| 4,935,869 | 6/1990 | Yamamoto | 364/200 |
| 5,130,977 | 7/1992 | May et al. | 370/60 |
| 5,150,358 | 9/1992 | Punj et al. | 370/468 |
| 5,159,685 | 10/1992 | Kung | 395/575 |
| 5,163,046 | 11/1992 | Hahne et al. | 370/79 |
| 5,210,746 | 5/1993 | Maher et al. | 370/79 |
| 5,220,562 | 6/1993 | Takada et al. | 370/401 |
| 5,231,633 | 7/1993 | Hluchyj et al. | 370/94.1 |
| 5,251,205 | 10/1993 | Callon et al. | 370/60 |
| 5,278,830 | 1/1994 | Kudo | 370/94.1 |
| 5,291,482 | 3/1994 | McHarg et al. | 370/413 |
| 5,293,379 | 3/1994 | Carr | 370/474 |
| 5,301,333 | 4/1994 | Lee | 395/725 |

(List continued on next page.)

OTHER PUBLICATIONS

"Loading Balancing for Multiple Interfaces for Transmission Control Protocol/Internet Protocol in VM/MVS", IBM Technical Disclosure Bulletin, 38(9):7–9 (Sep., 1995).
T. Nishizono et al., "Analysis on a Multilink Packet Transmission System", Electron. Commun. JPN 1, Commun., (USA), 68(9):98–104 (Sep., 1985).
International Search Report, PCT/US98/13203, 7 pages.
International Search Report, PCT/US98/13202, 4 pages.
International Search Report, PCT/US98/13368, 5 pages.
International Search Report, PCT/US98/13364, 4 pages.
International Search Report, PCT/US98/13365, 4 pages.
International Search Report, PCT/US98/13177, 4 pages.
International Search Report, PCT/US98/13206, 6 pages.
International Search Report, PCT/US98/13362, 5 pages.
International Search Report, PCT/US98/13380, 4 pages.
International Search Report, PCT/US98/13361, 5 pages.
International Search Report, PCT/US98/13200, 6 pages.
International Search Report, PCT/US98/13016, 4 pages.
International Search Report, PCT/US98/13199, 5 pages.
International Search Report, PCT/US98/13015, 5 pages.
Wang et al., A Novel Message Switch for Highly Parallel Systems, IEEE, pp. 150–155, 1989.

(List continued on next page.)

*Primary Examiner*—Joseph E. Palys
*Assistant Examiner*—Rijue Mai
*Attorney, Agent, or Firm*—Blakely Sokoloff Taylor & Zafman

[57] ABSTRACT

A system and method for dynamically resizing queues used in a network switch to accommodate potential congestion situations without experiencing data loss. In one embodiment, partition pointer registers are used to indicate when resizing is desirable. The control logic then determines when it is safe to update the size of the queue such that no data loss occurs and timely updates the queue size.

16 Claims, 6 Drawing Sheets

U.S. PATENT DOCUMENTS

| | | | |
|---|---|---|---|
| 5,309,437 | 5/1994 | Perlman et al. | 340/827 |
| 5,313,454 | 5/1994 | Bustini et al. | 370/13 |
| 5,343,471 | 8/1994 | Cassagnol | 370/85.13 |
| 5,353,412 | 10/1994 | Douglas et al. | 395/325 |
| 5,365,514 | 11/1994 | Hershey et al. | 370/17 |
| 5,386,413 | 1/1995 | McAuley et al. | 370/54 |
| 5,392,432 | 2/1995 | Engelstad et al. | 395/700 |
| 5,394,402 | 2/1995 | Ross | 370/94.1 |
| 5,396,602 | 3/1995 | Amini et al. | 395/325 |
| 5,402,415 | 3/1995 | Turner | 370/60 |
| 5,404,538 | 4/1995 | Krappweis, Sr. | 395/725 |
| 5,410,540 | 4/1995 | Aiki et al. | 370/390 |
| 5,410,722 | 4/1995 | Cornaby | 395/800 |
| 5,420,862 | 5/1995 | Perlman | 370/85.13 |
| 5,422,838 | 6/1995 | Lin | 365/49 |
| 5,425,026 | 6/1995 | Mori | 370/60 |
| 5,425,028 | 6/1995 | Britton et al. | 370/94.1 |
| 5,426,736 | 6/1995 | Guineau, III | 395/250 |
| 5,432,907 | 7/1995 | Picazo, Jr. et al. | 395/200 |
| 5,450,399 | 9/1995 | Sugita | 370/60.1 |
| 5,455,820 | 10/1995 | Yamada | 370/413 |
| 5,457,681 | 10/1995 | Gaddis et al. | 370/402 |
| 5,459,714 | 10/1995 | Lo et al. | 370/13.1 |
| 5,459,717 | 10/1995 | Mullan et al. | 370/351 |
| 5,461,611 | 10/1995 | Drake et al. | 370/54 |
| 5,461,624 | 10/1995 | Mazzola | 370/402 |
| 5,473,607 | 12/1995 | Hausman | 370/85.13 |
| 5,477,537 | 12/1995 | Dankert et al. | 370/60 |
| 5,481,540 | 1/1996 | Huang | 370/85.13 |
| 5,485,455 | 1/1996 | Dobbins et al. | 370/255 |
| 5,485,578 | 1/1996 | Sweazey | 395/200.54 |
| 5,490,139 | 2/1996 | Baker et al. | 370/60 |
| 5,490,252 | 2/1996 | Macera et al. | 395/200.01 |
| 5,490,260 | 2/1996 | Miller et al. | 395/427 |
| 5,493,564 | 2/1996 | Mullan | 370/54 |
| 5,500,860 | 3/1996 | Perlman et al. | 370/85.13 |
| 5,509,123 | 4/1996 | Dobbins et al. | 395/200.15 |
| 5,515,376 | 5/1996 | Murthy et al. | 340/402 |
| 5,517,488 | 5/1996 | Miyazaki et al. | 370/16 |
| 5,535,202 | 7/1996 | Kondoh | 370/60.1 |
| 5,550,816 | 8/1996 | Hardwick et al. | 370/60 |
| 5,553,067 | 9/1996 | Walker et al. | 370/60 |
| 5,555,405 | 9/1996 | Griesmer et al. | 395/600 |
| 5,557,610 | 9/1996 | Calamvokis et al. | 370/60.1 |
| 5,561,666 | 10/1996 | Christensen et al. | 370/434 |
| 5,561,791 | 10/1996 | Mendelson et al. | 395/550 |
| 5,563,878 | 10/1996 | Blakeley et al. | 370/60 |
| 5,566,170 | 10/1996 | Bakke et al. | 370/60 |
| 5,570,365 | 10/1996 | Yodhida | 370/85.6 |
| 5,572,522 | 11/1996 | Calamvokis et al. | 370/395 |
| 5,574,861 | 11/1996 | Lorvig et al. | 395/200.06 |
| 5,583,981 | 12/1996 | Pleyer | 395/326 |
| 5,592,476 | 1/1997 | Calamvokis et al. | 370/390 |
| 5,594,727 | 1/1997 | Kolbenson et al. | 370/468 |
| 5,600,641 | 2/1997 | Duault et al. | 370/400 |
| 5,602,841 | 2/1997 | Lebizay et al. | 370/413 |
| 5,606,669 | 2/1997 | Bertin et al. | 395/200.15 |
| 5,608,726 | 3/1997 | Virgile | 370/401 |
| 5,610,905 | 3/1997 | Murthy et al. | 370/401 |
| 5,615,340 | 3/1997 | Dai et al. | 395/200.17 |
| 5,617,421 | 4/1997 | Chin et al. | 370/402 |
| 5,619,497 | 4/1997 | Gallagher et al. | 370/394 |
| 5,619,500 | 4/1997 | Hiekali | 370/414 |
| 5,619,661 | 4/1997 | Crews et al. | 395/299 |
| 5,623,489 | 4/1997 | Cotton et al. | 370/381 |
| 5,633,710 | 5/1997 | Mandal et al. | 364/514 |
| 5,633,865 | 5/1997 | Short | 370/412 |
| 5,636,371 | 6/1997 | Yu | 395/500 |
| 5,640,605 | 6/1997 | Johnson et al. | 395/881 |
| 5,649,109 | 7/1997 | Griesmer et al. | 395/200.17 |
| 5,651,002 | 7/1997 | Van Seters et al. | 370/392 |
| 5,675,741 | 10/1997 | Aggarwal et al. | 370/200.12 |
| 5,684,800 | 11/1997 | Dobbins et al. | 370/401 |
| 5,689,506 | 11/1997 | Chiussi et al. | 370/388 |
| 5,689,518 | 11/1997 | Galand et al. | 371/37.1 |
| 5,691,984 | 11/1997 | Gardner et al. | 370/401 |
| 5,706,472 | 1/1998 | Ruff et al. | 395/497.04 |
| 5,720,032 | 2/1998 | Picazo, Jr. et al. | 395/200.8 |
| 5,724,348 | 3/1998 | Basso et al. | 370/384 |
| 5,724,358 | 3/1998 | Headrick et al. | 370/418 |
| 5,726,977 | 3/1998 | Lee | 370/235 |
| 5,734,651 | 3/1998 | Blakeley et al. | 370/392 |
| 5,734,865 | 3/1998 | Yu | 395/500 |
| 5,740,171 | 4/1998 | Mazzola et al. | 370/392 |
| 5,740,175 | 4/1998 | Wakeman et al. | 395/422 |
| 5,740,375 | 4/1998 | Dunne et al. | 395/200.68 |
| 5,742,604 | 4/1998 | Edsall et al. | 370/401 |
| 5,742,760 | 4/1998 | Picazo, Jr. et al. | 370/351 |
| 5,745,048 | 4/1998 | Taguchi et al. | 340/870.01 |
| 5,748,631 | 5/1998 | Bergantino et al. | 370/398 |
| 5,748,905 | 5/1998 | Hauser et al. | 395/200.79 |
| 5,751,967 | 5/1998 | Raab et al. | 395/200.58 |
| 5,751,971 | 5/1998 | Dobbins et al. | 395/200.68 |
| 5,754,540 | 5/1998 | Liu et al. | 370/315 |
| 5,754,774 | 5/1998 | Bittinger et al. | 395/200.33 |
| 5,754,801 | 5/1998 | Lambrecht et al. | 395/308 |
| 5,757,771 | 5/1998 | Li et al. | 370/235 |
| 5,757,795 | 5/1998 | Schnell | 370/392 |
| 5,761,435 | 6/1998 | Fukuda et al. | 395/200.68 |
| 5,764,634 | 6/1998 | Christensen et al. | 370/401 |
| 5,764,636 | 6/1998 | Edsall | 370/401 |
| 5,781,549 | 7/1998 | Dai | 370/398 |
| 5,784,559 | 7/1998 | Frazier et al. | 395/200.13 |
| 5,784,573 | 7/1998 | Szczepanek et al. | 395/200.8 |
| 5,790,546 | 8/1998 | Dobbins et al. | 370/400 |
| 5,790,808 | 8/1998 | Seaman | 395/200.53 |
| 5,802,047 | 9/1998 | Kinoshita | 370/359 |
| 5,802,052 | 9/1998 | Venkataraman | 370/395 |
| 5,802,278 | 9/1998 | Isfeld et al. | 395/200.02 |
| 5,812,527 | 9/1998 | Kline et al. | 370/232 |
| 5,815,737 | 7/1998 | Buckland | 395/905 |
| 5,822,319 | 10/1998 | Nagami et al. | 370/392 |
| 5,825,767 | 10/1998 | Mizukoshi et al. | 370/392 |
| 5,825,772 | 10/1998 | Dobbins et al. | 370/396 |
| 5,835,491 | 11/1998 | Davis et al. | 370/386 |
| 5,838,677 | 11/1998 | Kozaki et al. | 370/411 |
| 5,838,681 | 11/1998 | Bonomi et al. | 370/395 |
| 5,852,607 | 12/1998 | Chin | 370/401 |
| 5,856,977 | 1/1999 | Yang et al. | 370/411 |
| 5,859,849 | 1/1999 | Parks | 370/395 |
| 5,867,677 | 2/1999 | Tsukamoto | 395/311 |
| 5,872,783 | 2/1999 | Chin | 370/392 |
| 5,872,904 | 2/1999 | McMillen et al. | 395/182.02 |
| 5,875,464 | 2/1998 | Kirk | 711/129 |
| 5,878,043 | 3/1999 | Casey | 370/397 |
| 5,878,232 | 3/1999 | Marimuthu | 395/200.79 |
| 5,892,912 | 4/1999 | Suzuki et al. | 395/200.48 |
| 5,898,687 | 4/1999 | Harriman et al. | 370/390 |
| 5,931,980 | 11/1998 | Varma et al. | 370/395 |

OTHER PUBLICATIONS

Tobagi, Fast Packet SwitchArchitectures for Broadband Integrated Services Digital Networks, Proceedings of the IEEE, vol. 78, Issue 1, pp. 133–167, Jan. 1990.

Fliesser et al., Design of a Multicast ATM Packet Switch, Electrical and Computer Engineering, 1993 Canadian Conference, pp. 779–783, 1993.

Chang et al., An Overview of the Pipelined Common Buffer Architecture (PCBA) for Memory Based Packet/Cell Switching Systems, Local Computer Networks, 1994, pp. 288–297, 19th Conference, IEEE.

Agrawal et al., A Scalable Shared Buffer ATM Switch Architecture, VLSI, 1995 5th Great Lakes Symposium, IEEE, pp. 256–261, 1994.

Sabaa et al., Implementation of a Window–Based Scheduler in an ATM Switch, Electrical and Computer Engineering, 1995 Canadian Conference, IEEE, pp. 32–35, 1995.

Naraghi–Pour et al., A Multiple Shared Memory Switch, System Theory, 1996 Southeastern Symposium, IEEE, pp. 50–54, 1996.

Iyengar et al., Switching Prioritized Packets, GLOBECOM '89: IEEE Global Telecommunications Conference, pp. 1181–1186, 1989.

"Foundry Products", downloaded from Website http://www.foundrynet.com/ on Jun. 9, 1997.

Anthony J. McAuley & Paul Francis, "Fast Routing Table Lookup Using CAMs", IEEE, 1993, pp. 1382–1390.

"Gigabit Ethernet", Network Strategy Report, The Burton Group, v2, May 8, 1997, 40 pages.

"IP On Speed", Erica Roberts, Internet–Draft, Data Communications on the Web, Mar. 1997, 12 pages.

"Multilayer Topology", White Paper, Internet–Draft, 13 pages, downloaded from website http://wwwbaynetworks.com on Apr. 18, 1997.

Microsoft Press, "Microsoft Computer Dictionary Fourth Edition", Microsoft Corporation, 1999, 4 pages.

METHOD AND APPARATUS FOR DYNAMICALLY RESIZING QUEUES UTILIZING PROGRAMMABLE PARTITION POINTERS

BACKGROUND OF THE INVENTION

1. Field of the Invention

The present invention relates to the dynamic sizing of queues. More particularly, the present invention is directed to the resizing of queues in a network switch device.

2. Art Background

Computer network devices typically include queues that function to buffer incoming and outgoing data that pass through the different ports of a switch. The amount of data passing through the different ports of the switch can vary quite dramatically. In order to accommodate the various bandwidths encountered, the queues may be structured to accommodate an expected maximum bandwidth. However, in such a structure, a large portion of the queues remain unused as the situations that cause the maximum bandwidth utilization of the queue are infrequent. Some systems, therefore, set the queue size to accommodate some expected median bandwidth. However, problems immediately occur when the actual bandwidth exceeds the expected median.

An inadequate size may have severe performance implications for the entire switch. For example, in the many-to-one situation, the traffic patterns crossing the switch are such that several input ports need to forward data to one output port. This may cause a temporary congestion on the output port. Similarly, in a one-to-many situation, multi-cast traffic that arises from the input port may need to be forwarded to many output ports. This may cause traffic multiplication and again result in temporary congestion on an output port. In still another situation, a fast input port may forward traffic to a slow output port. This again will result in temporary congestion at the output port.

In addition to the problems caused by temporary congestion, other network requirements may cause other problems. Switches may need to provide multiple output queues per port in order to be able to support some of the quality of service (QOS) features, such as traffic type prioritization, traffic type discarding policies when one or more of the queues fill up and support for protocols that allow for bandwidth reservation and allocation such as RSVP (ReSerVation Protocol). Thus, it is desirable to provide a flexible mechanism that provides for dynamic tuning of the number and sizes of the output queues in a high performance switch network element without disrupting network services.

SUMMARY OF THE INVENTION

The system and method of the present invention provides a flexible mechanism that enables a dynamic tuning of output queues. This dynamic tuning capability enables the number and sizes of the queues to be modified without disrupting network services provided by the switch.

In one embodiment, the system includes a completion register, programmable partition pointers and a block of memory that is allocated to function as the output queues. The completion register is used to notify the software when partitioning has been completed. The partition pointers are used to program the updated locations of the partitions. The system, preferably using a state machine or other control logic, monitors the partition pointers to determine when a value is modified to indicate that one or more of the partitions are to be moved. The system, upon detecting that a partition is to be moved, will determine when it is a safe time to move the partition such that no data is lost or incorrectly assigned to a different queue. Once it is determined that it is safe to move the partition, the partition boundary is moved to resize one or two queues and the corresponding partition completion bit is set in the completion register.

Thus, the software can function to dynamically reallocate the sizing of partitions according to usage, minimizing the under utilization and over utilization problems experienced in the prior art.

BRIEF DESCRIPTION OF THE DRAWINGS

The objects, features and advantages of the present invention will be apparent to one skilled in the art from the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures such as circuits are shown in block diagram form in order not to obscure the present invention unnecessarily.

Figure 1:
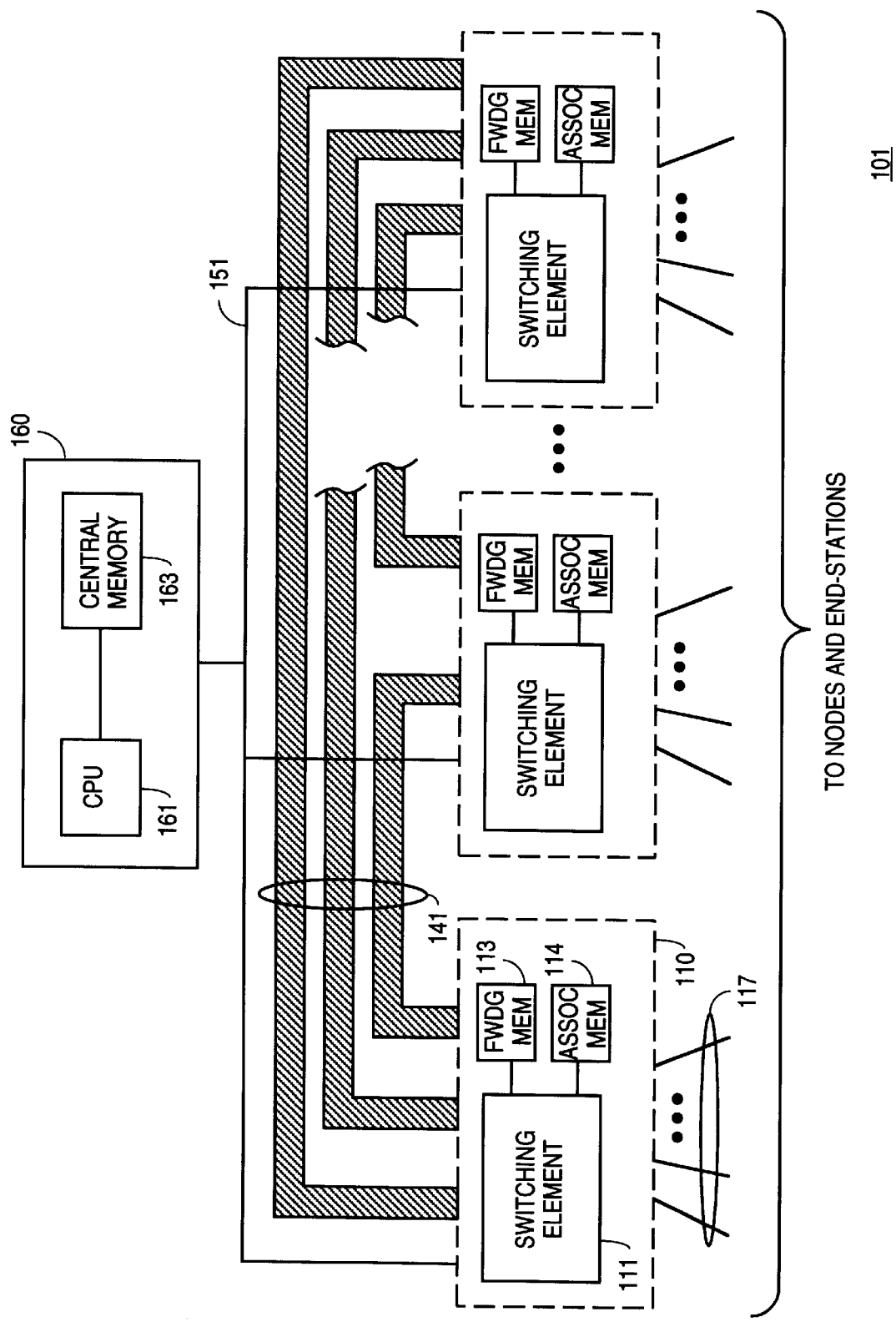
FIG. 1 is a simplified block diagram of an exemplary network element that incorporates the teachings of the present invention.

The system and method of the present invention provides a network element and process for lossless dynamic queue sizing. It is readily apparent that the process is applicable not only to network elements, but to other devices that require the benefit from dynamic queue sizing. An exemplary network element is shown in FIG. 1.

The network element is used to interconnect a number of nodes and end-stations in a variety of different ways. In particular, an application of the multi-layer distributed network element (MLDNE) would be to route packets according to predefined routing protocols over a homogenous data link layer such as the IEEE 802.3 standard, also known as the Ethernet. Other routing protocols can also be used.

The MLDNE's distributed architecture can be configured to route message traffic in accordance with a number of known or future routing algorithms. In a preferred embodiment, the MLDNE is configured to handle message traffic using the Internet suite of protocols, and more specifically the Transmission Control Protocol (TCP) and the Internet Protocol (IP) over the Ethernet LAN standard and medium access control (MAC) data link layer. The TCP is also referred to here as a Layer 4 protocol, while the IP is referred to repeatedly as a Layer 3 protocol.

In one embodiment of the MLDNE, a network element is configured to implement packet routing functions in a distributed manner, i.e., different parts of a function are performed by different subsystems in the MLDNE, while the final result of the functions remains transparent to the external nodes and end-stations. As will be appreciated from the discussion below and the diagram in FIG. 1, the MLDNE has a scalable architecture which allows the designer to predictably increase the number of external connections by adding additional subsystems, thereby allowing greater flexibility in defining the MLDNE as a stand alone router.

As illustrated in block diagram form in FIG. 1, the MLDNE 101 contains a number of subsystems 110 that are fully meshed and interconnected using a number of internal links 141 to create a larger switch. At least one internal link couples any two subsystems. Each subsystem 110 includes a switch element 111 coupled to a forwarding memory 113 and an associated memory 114. The forwarding memory (or database) 113 stores an address table used for matching with the headers of received packets. The associated memory (or database) stores data associated with each entry in the forwarding memory that is used to identify forwarding attributes for forwarding the packets through the MLDNE. A number of external ports (not shown) having input and output capability interface the external connections 117. In one embodiment, each subsystem supports multiple Gigabit Ethernet ports, Fast Ethernet ports and Ethernet ports. Internal ports (not shown) also having input and output capability in each subsystem couple the internal links 141. Using the internal links, the MLDNE can connect multiple switching elements together to form a multigigabit switch.

The MLDNE 101 further includes a central processing system (CPS) 160 that is coupled to the individual subsystem 110 through a communication bus 151 such as the peripheral components interconnect (PCI). The CPS 160 includes a central processing unit (CPU) 161 coupled to a central memory 163. Central memory 163 includes a copy of the entries contained in the individual forwarding memories 113 of the various subsystems. The CPS has a direct control and communication interface to each subsystem 110 and provides some centralized communication and control between switch elements.

Figure 2:
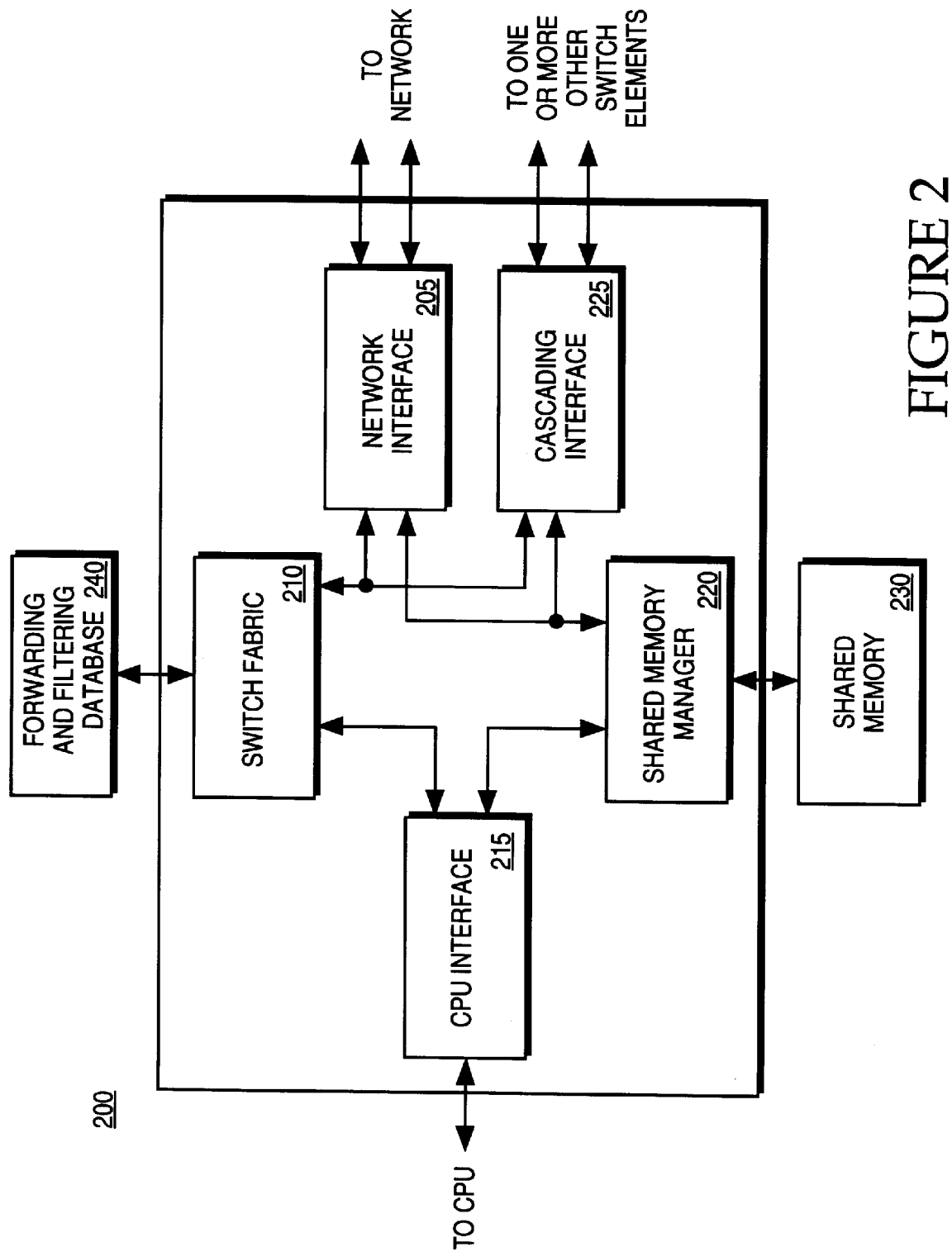
FIG. 2 is a simplified block diagram of a switch element utilized in the switch of FIG. 1.

FIG. 2 is a simplified block diagram illustrating an exemplary architecture of the switch element of FIG. 1. The switch element 200 depicted includes a central processing unit (CPU) interface 215, a switch fabric block 210, a network interface 205, a cascading interface 225, and a shared memory manager 220.

Ethernet packets may enter or leave the network switch element 200 through any one of the three interfaces 205, 215, or 225. In brief, the network interface 205 operates in accordance with corresponding Ethernet protocol to receive Ethernet packets from a network (not shown) and to transmit Ethernet packets onto the network via one or more external ports (not shown). An optional cascading interface 225 may include one or more internal links (not shown) for interconnecting switching elements to create larger switches. For example, each switch element may be connected together with other switch elements in a full mesh topology to form a multi-layer switch as described above. Alternatively, a switch may comprise a single switch element 200 with or without the cascading interface 225.

The CPU (not shown) may transmit commands or packets to the network switch element 200 via the CPU interface 215. In this manner, one or more software processes running on the CPU may manage entries in an external forwarding and filtering database 240, such as adding new entries and invalidating unwanted entries. In alternative embodiments, however, the CPU may be provided with direct access to the forwarding and filtering database. In any event, for purposes of packet forwarding, the CPU port of the CPU interface 215 resembles a generic input port into the switch element 200 and may be treated as if it were simply another external network interface port. However, since access to the CPU port occurs over a bus such as a peripheral components interconnect (PCI) bus, the CPU port does not need any media access control (MAC) functionality.

Returning to the network interface 205, the two main tasks of input packet processing and output packet processing will now briefly be described. Input packet processing may be performed by one or more input ports of the network interface 205. Input packet processing includes the following: (1) receiving and verifying incoming Ethernet packets, (2) modifying packet headers when appropriate, (3) requesting buffer pointers from the shared memory manager 220 for storage of incoming packets, (4) requesting forwarding decisions from the switch fabric block 210, (5) transferring the incoming packet data to the shared memory manager 220 for temporary storage in an external shared memory 230, and (5) upon receipt of a forwarding decision, forwarding the buffer pointer(s) to the output port(s) indicated by the forwarding decision. Output packet processing may be performed by one or more output ports of the network interface 205. Output processing includes requesting packet data from the shared memory manager 220, transmitting packets onto the network, and requesting deallocation of buffer(s) after packets have been transmitted.

The network interface 205, the CPU interface 215, and the cascading interface 225 are coupled to the shared memory manager 220 and the switch fabric block 210. Preferably, critical functions such as packet forwarding and packet buffering are centralized as shown in FIG. 2. The shared memory manager 220 provides an efficient centralized interface to the external shared memory for buffering of incoming packets. The switch fabric block 210 includes a search engine and learning logic for searching and maintaining the forwarding and filtering database with the assistance of the CPU.

The centralized switch fabric block 210 includes a search engine that provides access to the forwarding and filtering database on behalf of the interfaces 205, 215, and 225. Packet header matching, Layer 2 based learning, Layer 2 and Layer 3 packet forwarding, filtering, and aging are exemplary functions that may be performed by the switch fabric block 210. Each input port is coupled with the switch fabric block 210 to receive forwarding decisions for received packets. The forwarding decision indicates the outbound port(s) (e.g., external network port or internal cascading port) upon which the corresponding packet should be transmitted. Additional information may also be included in the forwarding decision to support hardware routing such as a new MAC destination address (DA) for MAC DA replacement. Further, a priority indication may also be included in the forwarding decision to facilitate prioritization of packet traffic through the switch element 200.

In the present embodiment, Ethernet packets are centrally buffered and managed by the shared memory manager 220. The shared memory manager 220 interfaces every input port and output port and performs dynamic memory allocation and deallocation on their behalf, respectively. During input packet processing, one or more buffers are allocated in the external shared memory and an incoming packet is stored by the shared memory manager 220 responsive to commands received from the network interface 205, for example. Subsequently, during output packet processing, the shared memory manager 220 retrieves the packet from the external shared memory and deallocates buffers that are no longer in use. To assure no buffers are released until all output ports have completed transmission of the data stored therein, the shared memory manager 220 preferably also tracks buffer ownership.

Figure 3:
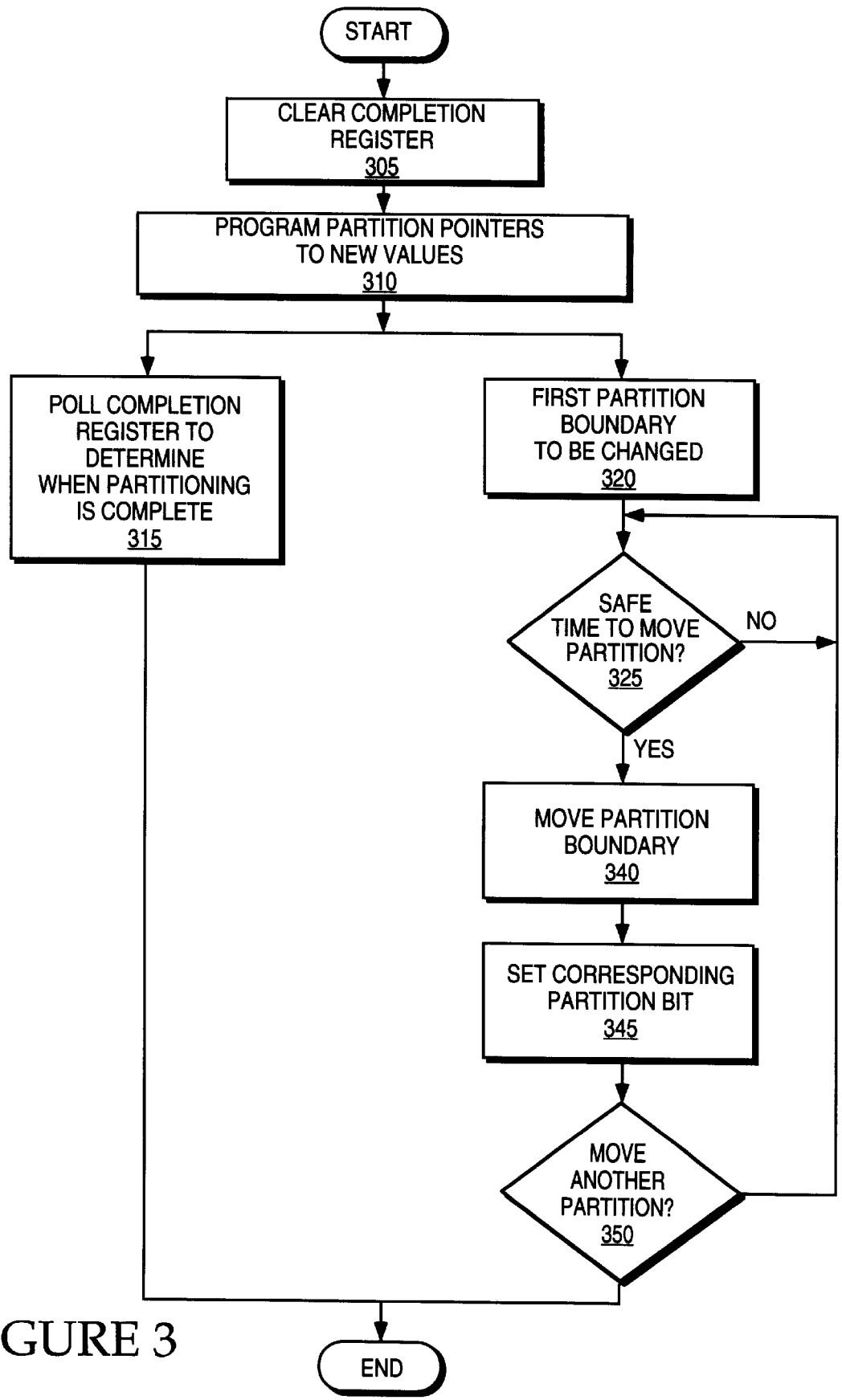
FIG. 3 is a flow chart illustrating one embodiment of the process of the present invention.

FIG. 3 generally illustrates a process for dynamic queue sizing in accordance with the teaching of the present invention.

Referring to FIG. 3, at step 305, the completion register is cleared. The completion register preferably is a register of multiple bits, one bit per queue, which indicates whether the resizing process or corresponding partition boundary affecting the queue has been completed. Alternately, the completion register contains 1 bit per boundary, similarly indicating when partition boundaries are completed or in process. As will be described below, once the resizing process or movement of the queue partition has been completed, the corresponding bit or bits in the completion register are set to indicate to the software that operations affecting the queue(s) can safely be processed.

At step 310, the programmable partition pointers are updated with the new values that reflect how the partition boundaries are to be moved. For example, the values could simply be memory addresses of the memory space allocated for the queues. Alternative indications such as relative movement, or virtual addresses, as well as other addressing techniques are contemplated. At step 315, the software then continues to poll the completion register to determine when the partitioning process is complete.

It is readily apparent that one or more of the partition pointers can be updated with new values to cause the corresponding partition boundaries to be moved. Thus, in any particular portion of the process, one or more of the partition boundaries can be moved. At step 320, the first partition boundary to be modified is referenced.

At step 325, it is determined whether it is safe to move the partition. Preferably, this is performed by control logic or a state machine that checks the state of certain pointers and activity in the queue to determine when it is safe to move the partition so that data already written into a queue is not, by the queue resizing process, moved to an adjacent queue and data written into a queue is not lost by an overriding function performed by the adjacent queue. Thus, generally speaking, it is safe to move a partition when no data entries exist in the area affected by movement of the partition.

At step 340, the partition boundary is then moved when it is safe and at step 345 the corresponding partition bit in the completion register is set. The process then continues at step 350 for each partition boundary to be moved.

Figure 4:
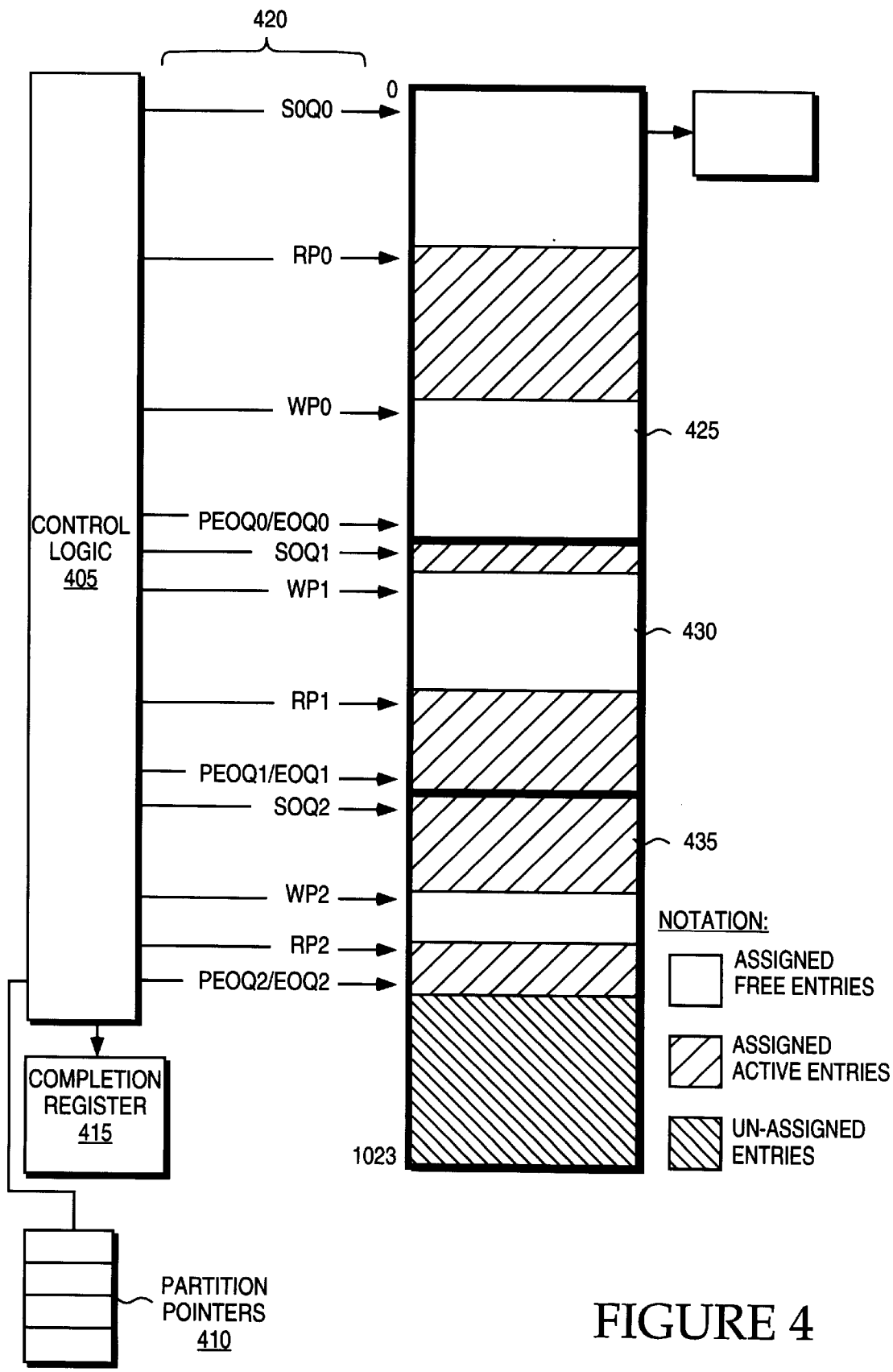
FIG. 4 is a simplified block diagram illustrating the memory space utilized for the queues and the parameters utilized in the process of dynamic reallocation of the partition boundaries between queues.
Figure 5:
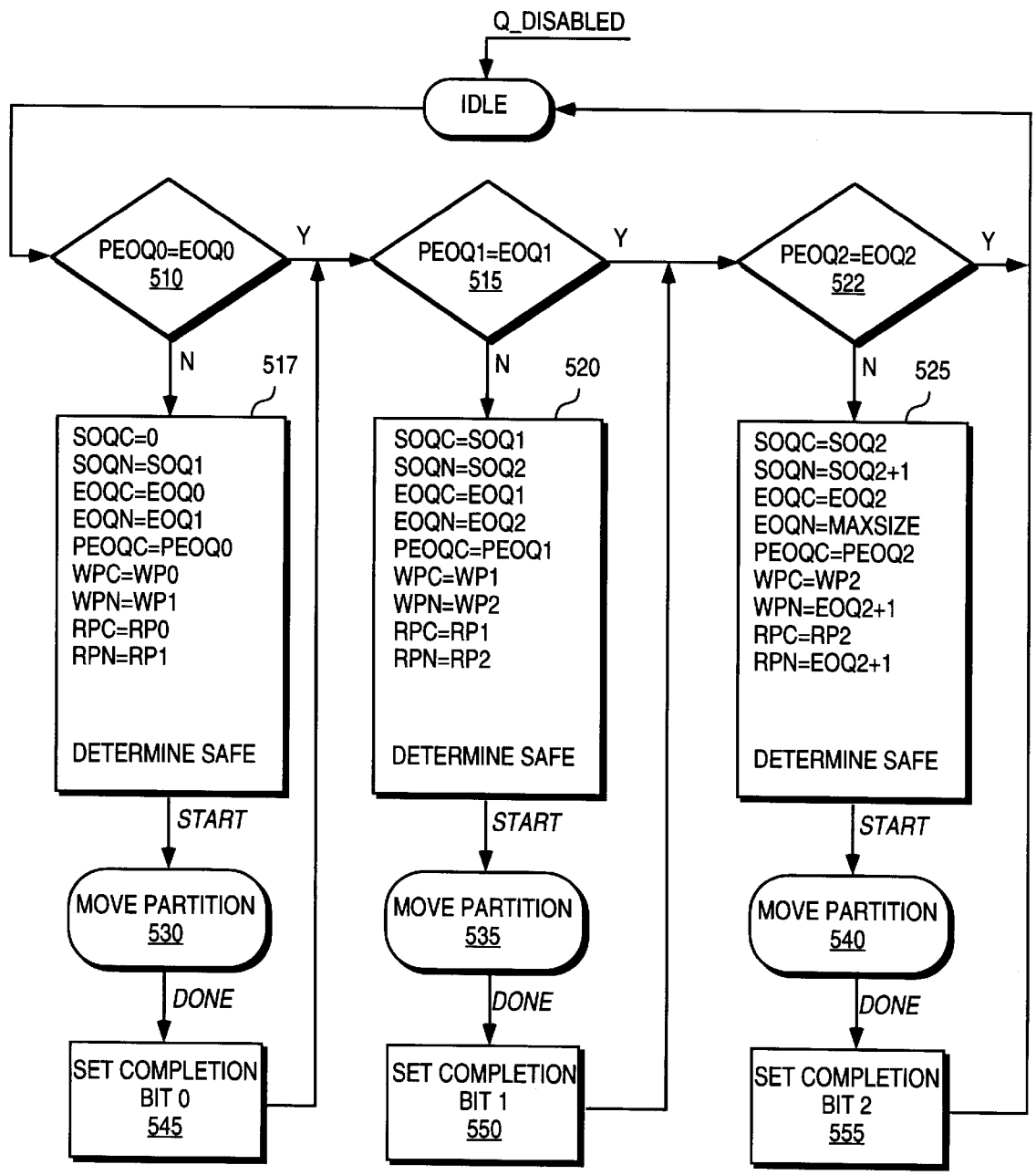
FIG. 5 is a flow chart illustrating one embodiment of the process for reallocating partition boundaries.

A simplified block diagram is shown in FIG. 4. In this illustration and in the flow diagrams of FIGS. 5 and 6, the following pointers are maintained for each queue partitioned:

SOQX: start of queue x indicates the first entry currently assigned to queue x.

EOQx: end of queue x indicates the last entry currently assigned to queue x.

PEOQx: partition end of queue x indicates last entry assigned to queue x as seen by the remainder of the device.

WPx: write pointer x—indicates next available (free) entry in queue x.

RPx: read pointer x indicates next active (occupied) entry in queue x.

FIG. 4 illustrates a block of memory that is utilized to form the queues of the switch. In the present embodiment, three queues q0, q1, q2 . . . , are described. It is readily apparent that the system can be configured to provide for a greater or lesser number of queues. In addition, it is preferred that a predetermined maximum number of queues are permissible, e.g., eight queues. If the current application requires fewer queues, the unused queues are maintained with a size entry of 1. Thus, the pointers remain accessible, but the amount of memory utilized for the queues is minimal. This greatly simplifies the reallocation process and enables the easy addition and removal of queues.

As noted earlier, control logic, preferably implemented as a state machine, references the partition pointers 410 and completion register 415, and maintains the various pointers 420 shown for the different queues 425, 430 and 435. As noted earlier, the remainder of the system interfaces with the queues through the partition pointers and completion register. The partition pointers are used by the system (e.g., software) to tell the control logic 405 that the partition boundaries need to be changed, and the completion register indicates to the remainder of the system when the update process to move partitions is completed.

In the present embodiment, the queues maintain pointers to buffers that contain the data that is being communicated through the corresponding port. It is readily apparent, however, that the queue structure could be used to maintain the data itself, as well as other information. One embodiment of the process for the update of queues is described with reference to FIG. 5. To begin the partition update process, each partition pointer is checked against the end of queue (EOQx) value to determine if the partition pointer value has been changed, steps 510, 515, 522. If the partition pointer value has been changed, as indicated when the partition pointer value does not equal the corresponding end of queue value, then the values of the various queue pointers, FIG. 5, step 517, 520, 525, are used by the control logic to determine when it is safe to move the particular partition. In the present embodiment, the process flow illustrates that for a particular partition boundary, the same process is performed using the same variables. However, the process is depicted as such for purposes of illustration and such a step is not necessarily required to perform the process. In addition, the process resizes a queue by movement of the lower boundary of a queue; it is readily apparent the other variations can be implemented (e.g., moving both lower boundaries and upper boundaries).

Once it is safe to move the partition, the partition is moved, steps 530, 535 and 540, and the corresponding completion bit is set, steps 545, 550, 555. The control logic then continues to check again whether the partition register values have been again updated indicating that the boundaries require update to resize the queue(s).

Figure 6:
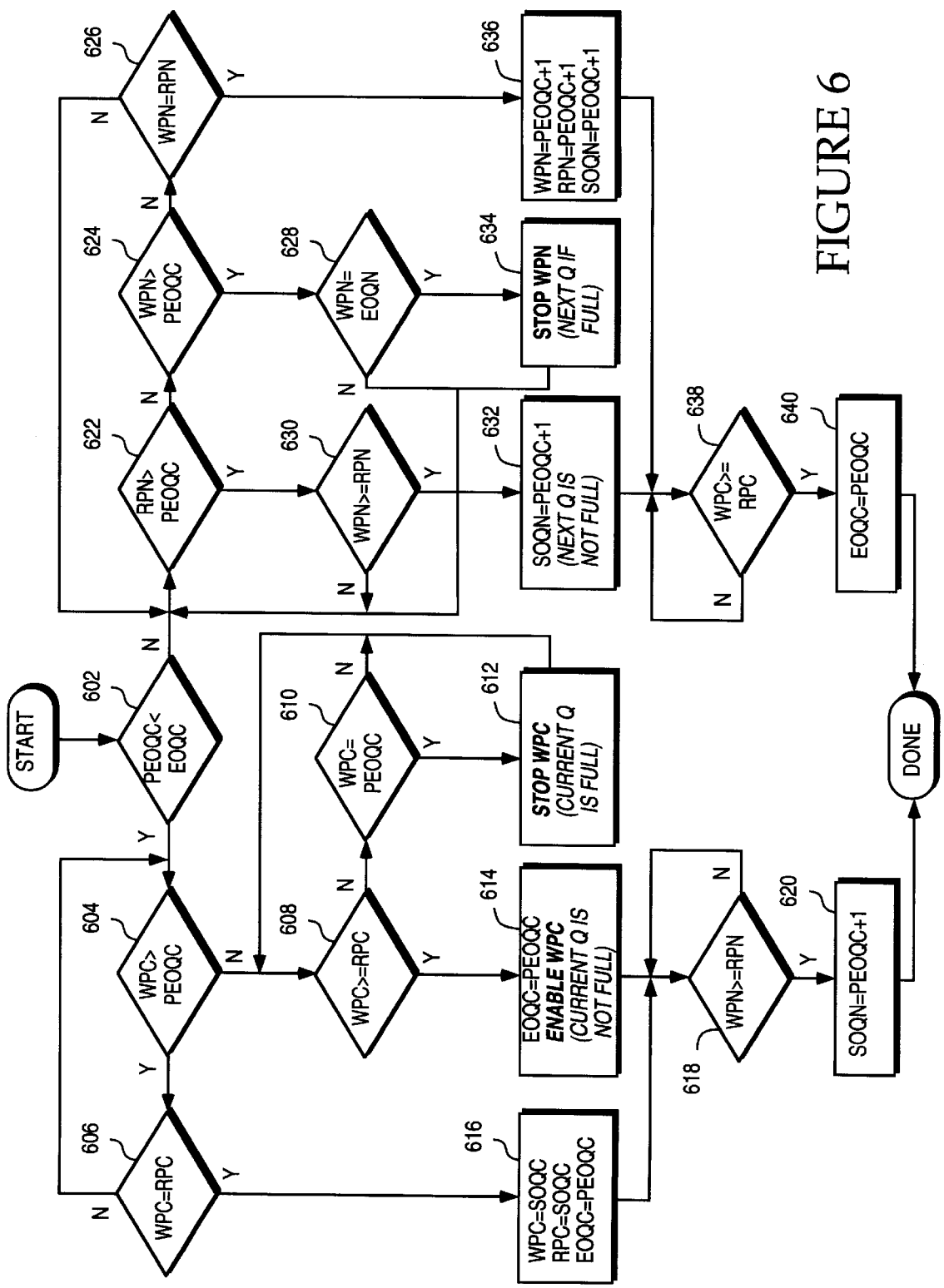
FIG. 6 is a flow chart illustrating one embodiment of the process for determining when a partition boundary is safe to move.

FIG. 6 is illustrative of one process performed to determine when it is safe to move the partition boundary, and once it is determined that it is safe, move the boundary. More particularly, the following process illustrates the prevention of loss of data due to preventing data written to a queue to appear in another queue due to the movement of the boundary before the data is output through the queue, and preventing data simply from being lost when the partition boundary is moved.

The depicted process assumes that the lower partition boundary of a particular queue is moved to resize the queue.

In addition, in the present embodiment, the queues are established in a contiguous memory space. Thus, when the partition boundary is moved, the size of the queue below the queue to be resized is also affected. To determine whether it is safe to resize the queue, the pointers for the queue to be resized (referred to herein as the "current" queue) are identified by the "C" subscript and the pointers for the queue below the one to be resized (referred to herein as the "next" queue) are identified by the "N" subscript.

At step 602, if the partition end of queue register value is less than the end of queue register value for the queue to be resized, then the queue is to be resized to be smaller and steps 604, 606, 608, 610, 612, 614, 616, 618, 620 are performed to determine when the resizing process is safe to perform and to resize the queue. If, at step 602, the partition end of queue register value is not less than the end of queue register value, then the queue is to be resized to be larger and steps 622, 624, 626, 628, 630, 632, 634, 636, 638, 640 are performed.

At step 604 if the write pointer is greater than the partition end of queue value, then the write pointer would be out of bounds in the resized queue. If at step 606, the write pointer equals the read pointer, then no data is currently in the queue and it is safe to update the pointers to resize the queue, step 616. However, if at step 606, the write pointer does not equal the read pointer, control returns to step 604. If at step 604, the write pointer is not greater than the partition end of queue, it is then determined whether the write pointer is greater than or equal to the read pointer indicating that the current queue is not full. At step 614, the end of queue pointer is safely updated to the partition end of queue pointer and the write pointer is enabled. At step 608, if the write pointer is less than the read pointer and at step 610 the write pointer is equal to the partition end of queue, the current queue is full and the write pointer is stopped, step 612. Control returns to step 608 to wait until it is safe to update the end of queue pointer and enable the write pointer.

Next, at step 618, it is determined whether it is safe to update the start of queue pointer for the next adjacent queue affected by the resizing of the queue. At step 618, if the write pointer for the next queue is greater than or equal to the read pointer for the next queue, the start of queue pointer for the next queue is set to the partition end of queue value plus 1.

Steps 604, 606, 608, 610, 612, 614, 616, 618, 620 illustrate the process of determining when it is safe to update and the process of updating the appropriate pointers to resize the queue to be smaller. A similar process is performed to resize the queue to be larger following steps 622, 624, 626, 628, 630, 632, 634, 636, 638, 640.

The invention has been described in conjunction with the preferred embodiment. It is evident that numerous alternatives, modifications, variations and uses will be apparent to those skilled in the art in light of the foregoing description.

What is claimed is:

1. A method for modifying sizes of queues comprising the steps of:
   programming partition pointers to indicate an updated location of at least one partition boundary of at least one queue;
   for each partition boundary to be updated;
   checking states of the at least one queue affected by movement of the location of the partition boundary;
   determining when it is safe to move each location of the partition boundary; and
   when it is determined that it is safe to move the location of the partition boundary, updating the partition boundary to the updated location.

2. The method as set forth in claim 1, further comprising the steps of:
   setting a completion register to a first state to indicate that at least one partition boundary is to be updated; and
   setting the completion register to a second state to indicate that the step of updating the partition boundary has completed.

3. The method as set forth in claim 2, wherein:
   the step of setting the completion register to the first state comprises for each partition to be updated, setting a corresponding bit in the completion register to a first value; and
   the step of setting the completion register to the second state comprises for each partition that is updated, setting the corresponding bit in the completion register to a second value.

4. The method as set forth in claim 1, wherein the step of determining that it is safe comprises the step of determining that data is not located in the area affected by movement of the partition boundary.

5. An apparatus comprising:
   a memory comprising at least one queue, each queue defined by partition boundaries;
   at least one partition pointer, each partition pointer identifying a location of a partition boundary; and
   control logic coupled to the memory and the at least one partition pointer, said control logic detecting when the at least one partition pointer is updated to a new location, determining when it is safe to move the partition boundary, and when it is safe to move the partition boundary, moving the partition boundary.

6. The apparatus as set forth in claim 5, wherein the memory comprises a plurality of queues ordered contiguously.

7. The apparatus as set forth in claim 5, further comprising a completion register, said completion register set to a first state to indicate that at least one partition boundary is to be updated and set to a second state to indicate that the at least one partition pointer has been updated.

8. The apparatus as set forth in claim 7, wherein the completion register comprises a plurality of bits, each bit corresponding to a partition boundary, such that a corresponding bit is set to a first value when a corresponding partition boundary is to be updated and set to a second value after the corresponding partition boundary has been updated.

9. The apparatus as set forth in claim 5, further comprising a start of queue pointer and end of queue pointer corresponding to each queue, said partition boundary updated by modifying the start of queue or end of queue.

10. The apparatus as set forth in claim 5, further comprising a write pointer and read pointer corresponding to each queue, said write pointer and read pointer used to determine when it is safe to update the partition boundary.

11. In a switch coupled to a network, said switch comprising a plurality of output ports, each port comprising at least one queue utilized to control the buffering of data to be output through the output port, a method for dynamically resizing queues comprising the steps of:
    determining when a queue needs to be resized;
    programming a partition pointer corresponding to a partition boundary of the queue to indicate an updated location of the partition boundary;
    checking states of at least one queue affected by movement of the location of the partition boundary;
    determining when it is safe to move the location of the partition boundary; and when it is determined that it is safe to move the location of the partition boundary, updating the partition boundary to the updated location.

12. The method as set forth in claim 11, further comprising the steps of:
    setting a completion register to a first state to indicate that at least one partition boundary is to be updated; and
    setting the completion register to a second state to indicate that step of updating the partition boundary has completed.

13. The method as set forth in claim 12, wherein:
    the step of setting the completion register to the first state comprises for each partition to be updated, setting a corresponding bit in the completion register to a first value; and
    the step of setting the completion register to the second state comprises for each partition that is updated, setting the corresponding bit in the completion register to a second value.

14. The method as set forth in claim 11, wherein the step of determining that it is safe comprises the step of determining that data is not located in the area affected by movement of the partition boundary.

15. The method as set forth in claim 11, wherein the queue is resized to be larger.

16. The method as set forth in claim 11, wherein the queue is resized to be smaller.

* * * * *